Figure 1:
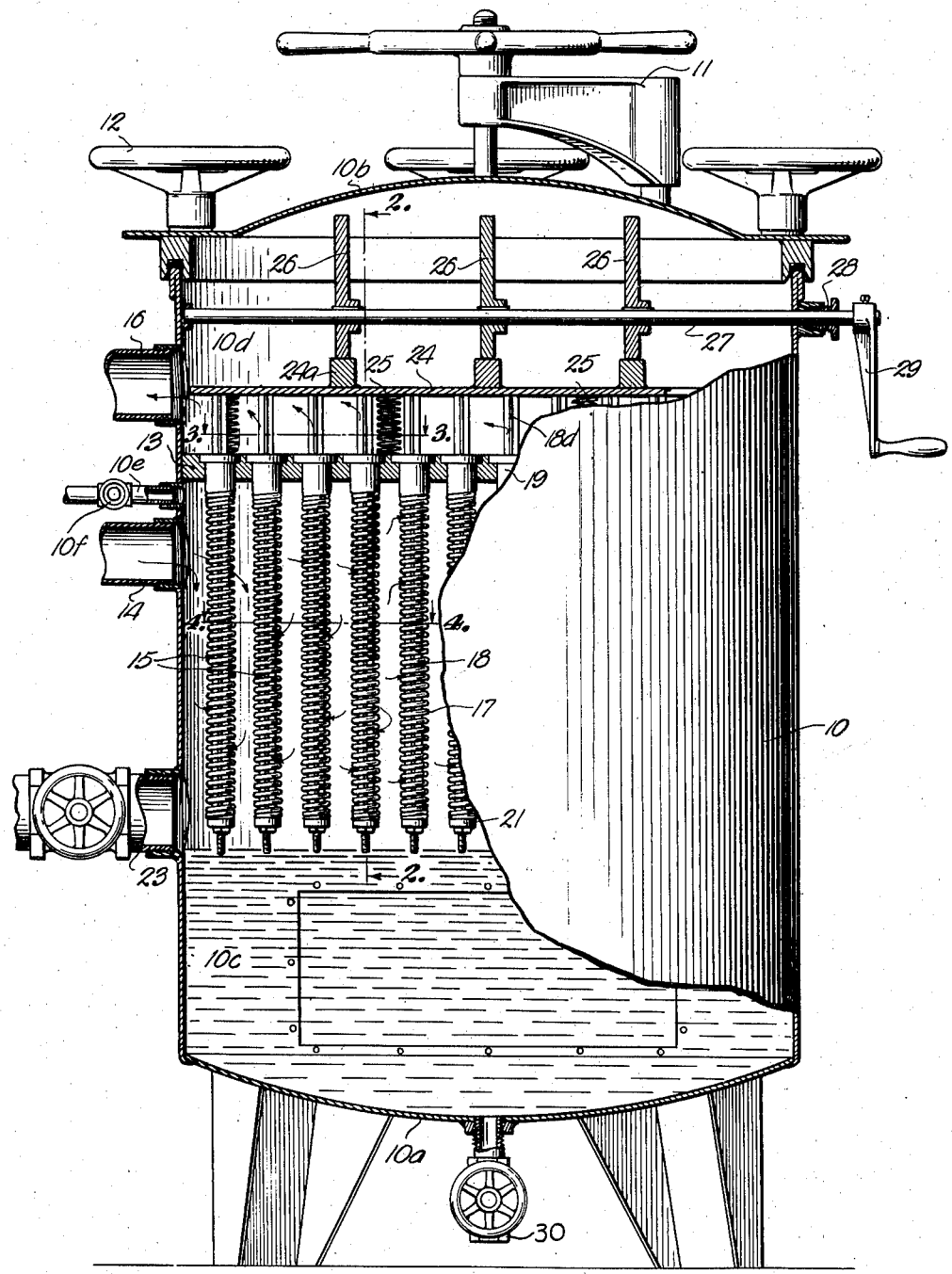

July 5, 1949. N. L. COOPERIDER ET AL 2,475,561
FILTER STRAINER
Filed Feb. 25, 1944 2 Sheets-Sheet 1

INVENTORS.
Noel L. Cooperider
Walter O. Damme
BY
ATTORNEY.

July 5, 1949.                N. L. COOPERIDER ET AL                2,475,561
                                  FILTER STRAINER
Filed Feb. 25, 1944                                                2 Sheets-Sheet 2

INVENTORS.
Noel L. Cooperider
Walter O. Damme
BY
ATTORNEY.

Patented July 5, 1949

2,475,561

UNITED STATES PATENT OFFICE 2,475,561

FILTER STRAINER

Noel L. Cooperider and Walter O. Damme, Kansas City, Mo., assignors to Butler Manufacturing Company, Kansas City, Mo., a corporation of Missouri Application February 25, 1944, Serial No. 523,868

4 Claims. (Cl. 210—184)

Our invention relates broadly to new and useful improvements in strainer and filter units and more particularly to a filter unit of the type used in dry cleaning equipment.

In conventional filter units for filtering dry cleaning solvents, a plurality of filter leaves attached to a manifold are mounted in a pressure-tight housing. Each filter leaf comprises a hollow frame covered with wire mesh or fabric.

In operation, the filter leaves are first coated with a filter aid such as diatomaceous earth by circulating the filter aid in a suitable liquid through the unit. The solvent to be filtered is then charged to the housing under pressure. In the housing the solvent passes through the filter aid into the leaves and thence to the manifold which conducts it from the housing. Contaminants in the solvent accumulate in the filter aid making it periodically necessary to clean the muck, sludge and contaminated filter aid from the leaves. This is usually done by mechanical scrapers and by backwashing, i. e. reversing the flow of liquid through the apparatus.

Furthermore, it is frequently necessary to remove the filter leaves from the housing for thorough cleaning. If wire mesh is used to cover the leaves, metal dust or particles in the solvent lodge in the openings and gradually obstruct the flow of liquid. This dust is extremely difficult to remove and is not dislodged by mechanical scraping or backwashing. If cloth bags are used they become saturated with dirt and grease and must be frequently removed and cleaned. In addition the cloth bags sometimes burst during the back-washing operation. Removing the leaves for cleaning is a difficult, unpleasant and time consuming task; and, of course, the filter unit is necessarily idle for a considerable length of time when the covers are being cleaned or replaced.

The covers must generally be replaced each time a different type of filter aid is used. The mesh openings must be large enough to permit free passage of the solvent but small enough to hold back the filter aid. Consequently, the covers are woven to support a particular type of filter aid. If the filter unit is used to filter liquids which require different types of filter aids it is necessary to keep several sets of covers for the filter leaves. This is expensive and wasteful.

An important object of our invention is to provide a novel filter leaf construction that eliminates the conventional fabric or wire mesh cover.

Another object of our invention is to provide a filter that is easily cleaned without being removed from the housing.

Still another object of our invention is to provide a filter that can be cleaned much more rapidly than the conventional filter leaves.

Yet another object of our invention is to provide a filter that is readily adjustable to accommodate various types or grades of filter aid.

A further object of our invention is to provide a device of the above-mentioned character wherein the filter openings are adjustable over a wide range so that the filter can be used without filter aid as a strainer to hold back only relatively large particles in a liquid.

A still further object of our invention is to provide a device of the above-mentioned character that is inexpensive to manufacture and sturdy and efficient in operation.

Other objects and advantages of our invention will be apparent during the course of the following description.

Figure 2:
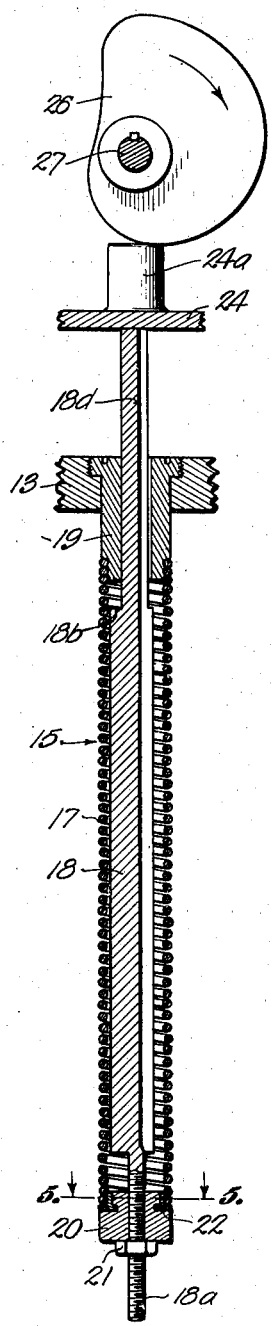
Figure 3:
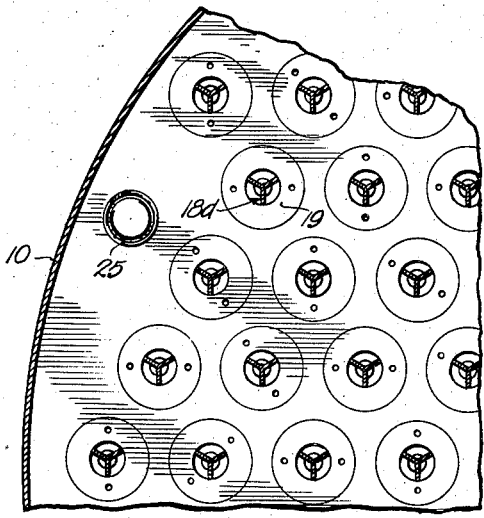
Figure 4:
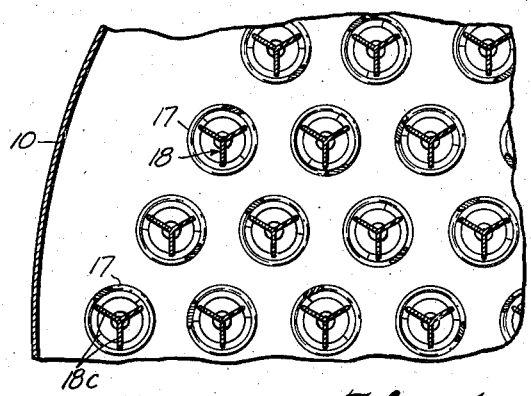
Figure 5:
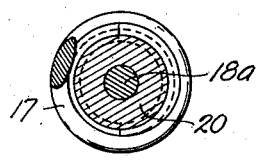

In the drawings forming a part of this specification and wherein like numerals are employed to designate like parts throughout the same, Fig. 1 is a side elevation of a filter unit embodying our invention, parts of the unit being broken away for a clearness of illustration, Fig. 2 is a vertical sectional view taken on the line 2—2, Fig. 3 is a fragmentary transverse sectional view taken on the line 3—3 of Fig. 1, Fig. 4 is a fragmentary transverse sectional view taken on the line 4—4 of Fig. 1, and Fig. 5 is a transverse sectional view taken on the line 5—5 of Fig. 2.

In the drawing, wherein for the purpose of illustration is shown a preferred embodiment of our invention, the numeral 10 designates a cylindrical housing having a closed bottom 10a and a removable top cover 10b. Cover 10b is carried by a pivoted arm 11 and is normally held in fluid tight engagement with the housing by pressure nuts 12. A transverse partition or header 13 divides the housing into a lower compartment 10c and an upper compartment 10d. Fluid to be filtered is admitted under pressure into the lower compartment 10c through pipe 14. As the liquid rises in the compartment air is vented through pipe 10e controlled by the air relief valve 10f. Hydrostatic pressure in the lower compartment 10c forces the solvent through a plurality of filters 15 suspended from partition 13 and into the upper compartment 10d from which it discharges through pipe 16.

The principal novelty of this invention resides in the filter elements 15. Attention is now directed to Fig. 2 which best shows the filter construction.

Each filter element comprises a vertical helical spring 17 which surrounds an elongated core 18. The upper end of the spring is fixedly attached to a nipple 19 threaded in the partition 13, and the lower end of the spring is closed by a suitable plug 20 which, in turn, is threaded on a stem 18a extending from the lower end of core 18. The core 18 is formed at its upper end with a shoulder 18b which is normally seated against nipple 19 by the action of spring 17. The length of the spring and accordingly the spatial relation of the spring loops is controlled by the position of plug 20 on stem 18a. The plug is held in a selected adjusted position on the stem by lock nut 21. A slip ring 22 between the spring and plug prevents the spring from twisting when the plug is rotated. The spring may have any desired cross-sectional shape. Any shape is satisfactory that will permit the spring to entirely close, i. e. permit the spring loops to press together when plug 20 is advanced a maximum distance on the stem. When the plug is thus positioned no liquid can pass between the spring loops. In order that the spring function as a filter it is necessary to spread the spring loops slightly by retracting plug 20. Since the spring is supported only at its ends the spring loops are uniformly spaced. The size of the openings or interstices between the spring loops, of course, depends upon the distance the plug 20 is retracted. By carefully adjusting the plug the spring loops can be spaced apart a selected distance. When the filter is used to remove contaminants from dry cleaning solvent the spring loops should be spaced apart approximately .003 of an inch. This spacing of the loops retains the filter aid normally used for dry cleaning solvents but permits free passage of the filtered solvent between the loops. As shown in Fig. 3, core 18 is formed with a plurality of radial vanes 18c which provide longitudinal passages through which the filtered solvent within the springs passes into the upper compartment 10d. Formed on the upper end of the core is a stem 18d which extends through nipple 19 and above the partition 13. Stem 18d is smaller in diameter than the core 18 and comprises upward extensions of vanes 18c. Any or all of the filters 15 can be removed for inspection or replacement by lifting cover 10b and unthreading nipple 19.

The filter aid around the filters gradually becomes contaminated with dirt, grease and insoluble particles such as metal dust in the solvent. These contaminants gradually fill the pores of the filter aid and obstruct flow of fluid therethrough. When this occurs, the filter aid must be removed from the filters and the filters and housing thoroughly cleaned. Removal of the filter aid is accomplished by draining the solvent from the housing through a valve controlled pipe 23 and jarring the filters to dislodge the filter aid.

The filters are simultaneously jarred to dislodge the filter aid by manually operated mechanism in the upper compartment 10d. A horizontal plate 24 is supported above the projecting filter stems 18d by a plurality of springs 25. The plate can be manually lowered against the stems by rotation of eccentric cams 26 against studs 24a. The cams are keyed on a shaft 27 which extends transversely through the housing. One end of the shaft extends from the housing through a stuffing box 28 and carries a handle 29. When handle 29 is rotated to move cams 26 in the direction of the arrow in Fig. 2 the plate 24 is lowered against the action of springs 25 to simultaneously depress the filter stems 18d. This action extends the filter screws and breaks away the cakes of filter aid which fall to the bottom of the housing and are easily removed. When cams 26 return to their original position the filters are suddenly released. Springs 25 raise plate 24 and permit the filter springs to rapidly contract. This rapid contraction together with the resultant vibration or quivering of the filter springs dislodges any remaining filter aid adhering thereto. If desired solvent can also be backwashed through the filter to thoroughly wash and clean them. If the backwashing is done with the filter springs extended all matter on or between the spring loops is efficiently removed. Liquid and muck in the housing below drain pipe 23 is removed through the cleanout valve 30.

It may thus be seen that we have accomplished the objects of our invention. We have provided a filter that is sturdily constructed and that can be easily cleaned. Cleaning is rapidly accomplished without removing the filters from the housing. It is unnecessary to enclose the main filter structure with fabric or wire mesh covers, since the springs can be accurately adjusted to regulate the spatial relation of the spring loops and adjustment is effective over a sufficiently wide range so that the device can be used with different filter aids and either as a filter or strainer.

It is to be understood that the form of the invention herewith shown and described is to be taken as a preferred embodiment of the same and that various changes in the size shape and arrangement of parts may be resorted to without departing from the spirit of our invention or the scope of the appended claims.

Having thus described our invention, we claim:

1. In a filter apparatus a housing, a horizontal perforated partition dividing the housing into upper and lower compartments, an inlet to the housing below the partition and an outlet above the partition a helical spring suspended from the partition, a plug closing the lower end of the spring, a core within the spring, means limiting upward movement of the core unit in the spring, a stem on the lower end of the core extending through the plug, means for moving the plug along the stem and securing it in a selected adjusted position, a stem on the upper end of the core extending through and above the partition, and means movable against the projecting end of the upper stem to depress the same and extend said spring to release matter lodged between the spring loops.

2. In a filter apparatus a housing, a horizontal perforated partition dividing the housing into upper and lower compartments, an inlet to the housing below the partition and an outlet above the partition a helical spring having a closed lower end suspended from the partition, a core within the spring, and adjustable means coacting with the core to constrict or expand the spring whereby to control the spatial relation of the spring loops at a first interval, a stem on the upper end of the core extending through and above the partition, and means movable against the projecting stem to depress the same and extend the spring to release matter lodged between the spring loops.

3. In a filter apparatus, a housing, a perforated horizontal partition dividing the housing into upper and lower compartments, an inlet in the housing below the partition and an outlet above the partition, a plurality of helical springs suspended from the partition, each spring having a closed lower end, a core within each spring extending the length thereof and terminating at its upper end in a stem which extends through and above the partition, a common plate engaging the upper ends of all of said stems, and mechanism for depressing said plate thereby to extend said springs and release matter lodged between the spring loops.

4. A filter apparatus as in claim 3 wherein said mechanism comprises a rotatable cam adapted to bear against and reciprocate said plate as the cam turns.

NOEL L. COOPERIDER.
WALTER O. DAMME.

REFERENCES CITED

The following references are of record in the file of this patent:

UNITED STATES PATENTS

| Number | Name | Date |
|---|---|---|
| 408,487 | Jewell | Aug. 6, 1889 |
| 1,279,611 | Timmins | Sept. 24, 1918 |
| 2,068,282 | Strindberg | Jan. 19, 1937 |
| 2,197,971 | Elze et al. | Apr. 23, 1940 |
| 2,301,430 | Malanowski | Nov. 10, 1942 |

FOREIGN PATENTS

| Number | Country | Date |
|---|---|---|
| 502,103 | Great Britain | Mar. 10, 1939 |
| 527,259 | Great Britain | Oct. 4, 1940 |
| 636,693 | France | Jan. 14, 1928 |